(12) United States Patent
Lu et al.

(10) Patent No.: US 11,340,504 B2
(45) Date of Patent: May 24, 2022

(54) DISPLAY PANEL

(71) Applicant: Wuhan China Star Optoelectronics Technology Co., Ltd., Hubei (CN)

(72) Inventors: Yantao Lu, Hubei (CN); Guanghui Liu, Hubei (CN); Chao Wang, Hubei (CN); Jiakuai Bian, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 60 days.

(21) Appl. No.: 16/638,226

(22) PCT Filed: Nov. 15, 2019

(86) PCT No.: PCT/CN2019/118898
§ 371 (c)(1),
(2) Date: Feb. 11, 2020

(87) PCT Pub. No.: WO2020/168762
PCT Pub. Date: Aug. 27, 2020

(65) Prior Publication Data
US 2021/0231995 A1 Jul. 29, 2021

(30) Foreign Application Priority Data
Feb. 22, 2019 (CN) .......................... 201910135413.3

(51) Int. Cl.
*G02F 1/1345* (2006.01)
*G02F 1/1333* (2006.01)

(52) U.S. Cl.
CPC ...... *G02F 1/13452* (2013.01); *G02F 1/13454* (2013.01); *G02F 1/133308* (2013.01)

(58) Field of Classification Search
None
See application file for complete search history.

(56) References Cited

U.S. PATENT DOCUMENTS

| | | | | |
|---|---|---|---|---|
| 2013/0016267 | A1* | 1/2013 | Ko | G06F 1/1686 348/333.01 |
| 2013/0155345 | A1* | 6/2013 | Ogasawara | G02F 1/136286 349/46 |
| 2013/0328051 | A1* | 12/2013 | Franklin | H05K 1/028 257/59 |
| 2014/0029219 | A1* | 1/2014 | Oh | G02F 1/13452 361/760 |
| 2019/0189075 | A1* | 6/2019 | Kim | H01L 23/60 |

\* cited by examiner

*Primary Examiner* — Phu Vu
(74) *Attorney, Agent, or Firm* — Luedeka Neely Group, P.C.

(57) ABSTRACT

A display panel is provided and includes an array substrate and a display region disposed on a surface of the array substrate, wherein a portion of the array substrate not covered by the display region forms a bezel, and a driving chip and a flexible circuit board are bound in the bezel; wherein at least one a protrusion is formed at an end of the bezel away from the display region, the driving chip is located between an edge of the protrusion and an edge of the display region; and a portion of the flexible circuit board is bent to a back of the array substrate via an edge of an indent on at least one lateral side of the protrusion.

10 Claims, 6 Drawing Sheets

DISPLAY PANEL

FIELD OF INVENTION

The present invention relates to a technical field of displays, and particularly to a narrow-bezel display panel.

BACKGROUND OF DISCLOSURE

With the development of full-screen display technology, screen-body ratios of current displays are constantly increasing, and lower bezels of the displays are getting smaller. However, narrowing the lower bezel directly compresses a space for setting a driving chip, traces or other components, and the driving chip is moved close to an edge of an array substrate. Because cracks and defects may easily occur to glass when glass of the substrate is being cut, the cracks extending to a binding region may cause electrical failure after the driving chip is mounted. The smaller a space is for traces extending from the driving chip to a display region, the closer the driving chip is to the display region, which may make a coated frame sealant of the panel too thin, and thereby cause a series of defects, such as liquid crystal leakage.

Technical Problems

While a screen-body ratio of a conventional display panel is increased, an area of a bezel is severely reduced, causing the driving chip to be too close to a display region and an edge of a substrate, and thereby causing technical defects, such as poor electrical properties and poor panel sealing, after the driving chip is mounted.

SUMMARY OF INVENTION

The present disclosure provides a display panel. An end of an array substrate end in the display panel is provided with a protrusion, which increases a distance between a driving chip and a display region, and a distance between the driving chip and an edge of a bezel, so as to solve the technical defects of the display panel in the prior art that an area of the bezel is severely reduced when a screen-body ratio is increased, causing the driving chip to be too close to the display region and an edge of the substrate, and thereby causing poor electrical properties, and poor sealing of the liquid crystal cell after the driving chip is mounted.

To solve the above problems, the technical solution provided by the present disclosure is as follows:

The present disclosure provides a display panel including an array substrate and a display region disposed on a surface of the array substrate, wherein a portion of the array substrate not covered by the display region forms a bezel, and a driving chip and a flexible circuit board are bound in the bezel;

wherein at least one a protrusion is formed at an end of the bezel away from the display region, and the driving chip is located between an edge of the protrusion and an edge of the display region; wherein a portion of the flexible circuit board is bent to a back of the array substrate via an edge of an indent adjacent at least one lateral side of the protrusion.

In the display panel of the present disclosure, a distance between an edge of the driving chip close to the display region and the edge of the display region is greater than a distance between an edge of the driving chip close to the protrusion and the edge of the protrusion.

In the display panel of the present disclosure, the driving chip is disposed in the bezel and is located outside a region of the protrusion.

In the display panel of the present disclosure, the driving chip is completely or partially disposed in a region of the protrusion.

In the display panel of the present disclosure, the protrusion includes two symmetrically arranged short edges connecting edges of the bezel, and a long edge connecting ends of the two short edges; the short edges are perpendicular to the edges of the bezel; and an angle formed between the short edges and the edges of the bezel is a non-right angle.

In the display panel of the present disclosure, the protrusion includes a convex arc edge, two ends of the convex arc edges are connected to the edges of the bezel, and the ends of the convex arc edges are in concave arc transitions.

In the display panel of the present disclosure, at least one set of gate on array (GOA) traces are disposed on the array substrate, the GOA traces include a parallel segment located outside the display region and being parallel to edges of the display region, and an inclined segment located in the bezel and towards the driving chip, the inclined segment of the GOA traces is connected to the driving chip to input a gate signal, and the parallel segment of the GOA traces is connected to a scan line of each pixel row to output the gate signal; wherein a plurality of metal terminals are disposed in the bezel and configured for accessing signals of the flexible circuit board, and the metal terminals include at least a primary signal metal terminal group and a secondary signal metal terminal group, wherein the primary signal metal terminal group is arranged close to the driving chip, and the secondary signal metal terminal group is arranged away from the driving chip and the inclined section of the GOA traces.

In the display panel of the present disclosure, the secondary signal metal terminal group and the primary signal metal terminal group are separately disposed, the primary signal metal terminal group is completely or partially located within a region of the protrusion, and the secondary signal metal terminal group is located outside the region of the protrusion.

In the display panel of the present disclosure, the flexible circuit board includes a main body section and a connection section for connecting the metal terminals, the connection section includes a first block correspondingly connected with the main signal metal terminal group, and a second block correspondingly connected with the secondary signal metal terminal group, and the first block is offset from the second block.

In the display panel of the present disclosure, a virtual metal terminal group is further disposed in the bezel, and the virtual metal terminal group is located adjacent a lateral side of the secondary signal metal terminal group away from the driving chip and the inclined segment of the GOA traces.

In the display panel of the present disclosure, an area of each of the metal terminals in the primary signal metal terminal group is equivalent to an area of each of the metal terminals in the secondary signal metal terminal group; a height of each of the metal terminals of the main signal metal terminal group is lower than a height of each of the metal terminals of the secondary signal metal terminal group, and a width of each of the metal terminals of the main signal metal terminal group is wider than a width of each of the metal terminals of the secondary signal metal terminal group.

In the display panel of the present disclosure, a height of each of the metal terminals in the main signal metal terminal group gradually lowers from the metal terminals away from the driving chip and the inclined segment of the GOA traces to the metal terminals close to the driving chip and the inclined segment of the GOA traces; and a width of each of the metal terminals in the main signal metal terminal group gradually increases from the metal terminals away from the driving chip and the inclined segment of the GOA traces to the metal terminals close to the driving chip and the inclined segment of the GOA traces.

In the display panel of the present disclosure, the flexible circuit board includes a main body section and a connection section for connecting the metal terminals, an end of the connection section has a regular geometric shape, the end of the connection section is provided with a first connection region and a second connection region, the first connection region covers and connects the main signal metal terminal group, and the second connection region covers and connects the secondary signal.

Beneficial Effects:

The beneficial effects of the present disclosure is as follows: compared with the existing display panel, the display panel provided by the present disclosure is provided with the protrusion at the end of the array substrate, and the driving chip is provided in the space between the display region and the protrusion, thereby increasing the distance between the driving chip and the edge of the display region and the distance between the driving chip and the edge of the bezel, and preventing the technical defects that the area of the bezel in a display screen with a high screen-body ratio is compressed, causing the driving chip to be too close to the display region and an edge of the substrate, and thereby causing poor electrical properties, and poor sealing of the liquid crystal cell after the driving chip is mounted. Moreover, a bending section of the flexible circuit board is located in flat regions adjacent both lateral sides of the protrusion, and the thickness of the bending section does not exceed the edge of the protrusion, so a width of the bezel is not increased, and the screen-body ratio of the display device is maintained.

BRIEF DESCRIPTION OF DRAWINGS

In order to more clearly illustrate the embodiments of the present invention or the technical solutions in prior arts, the following briefly introduces the accompanying drawings used in the embodiments. Obviously, the drawings in the following description merely show some of the embodiments of the present invention. As regards one of ordinary skill in the art, other drawings can be obtained in accordance with these accompanying drawings without making creative efforts.

DETAILED DESCRIPTION OF PREFERRED EMBODIMENTS

The specific structural and functional details disclosed herein are merely representative, and are used to describe exemplary embodiments of the present disclosure. However, this disclosure may be embodied in many alternative forms and should not be construed as being limited to only the embodiments set forth herein.

In the description of the present disclosure, the terms "first" and "second" are only used for descriptive purposes, and cannot be understood as indicating or implying relative importance or implicitly indicating the number of technical features indicated. Therefore, the features defined as "first" and "second" may explicitly or implicitly include one or more of the features. In the description of the present disclosure, unless otherwise stated, "a plurality" means two or more. In addition, the term "including" and any variations thereof are intended to cover non-exclusive inclusion.

In the present disclosure, it is noted that, unless otherwise explicitly set forth and defined, the terms "mount", "contact", and "conned" should be understood broadly, and, for example, may be fixedly connected, detachably connected, integrally connected, mechanically connected, electrically connected, directly connected, or indirectly connected through an intermediate medium, or internally communicated within two components. For those of ordinary skill in the art, the specific meaning of these terms in the present disclosure should be understood on a basis of a specific case situation.

The terminology used herein is for the purpose of describing particular embodiments only and is not intended to limit the exemplary embodiments. Unless the context clearly indicates otherwise, the singular forms "a" and "an" as used herein are intended to include the plural. It should also be understood that the terms "including" and/or "comprising" as used herein specify the presence of stated features, integers, steps, operations, units and/or components without precluding the presence or addition of one or more other features, integers, steps, operations, units, components, and/or combinations thereof.

The present disclosure is further described below with reference to the drawings and embodiments.

The present disclosure is directed to the technical problem of a display panel of the prior art: While a screen-body ratio of a conventional display panel is increased, an area of a bezel is severely reduced, causing the driving chip to be too close to a display region and an edge of a substrate, and thereby causing technical defects, such as poor electrical properties and poor panel sealing, after the driving chip is mounted. The present embodiments can resolve the defect.

Figure 1A:
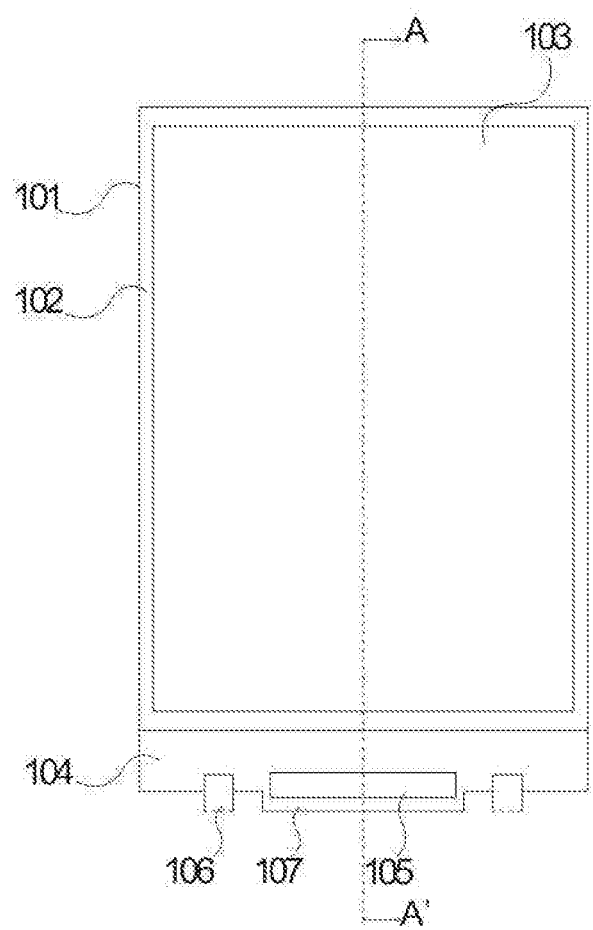
FIG. 1A is a schematic diagram of a front view structure of a display panel provided in the present disclosure.
Figure 1B:
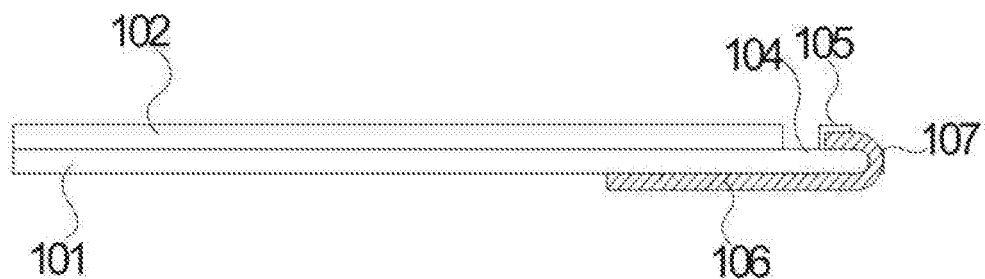
FIG. 1B is a schematic diagram of a cross-sectional structure in the direction A-A' of FIG. 1A.

As shown in FIG. 1, the display panel provided in this disclosure includes an array substrate 101 and a color filter substrate 102 disposed opposite the array substrate 101. A surface of the array substrate 101 is provided with a display region 103, and the display region 103 is defined by a frame sealant. A liquid crystal layer is disposed inside the frame sealant, and the color filter substrate 102 and the array substrate 101 are combined by the frame sealant.

The regions between the display region 103 and edges of the array substrate 101 form a bezel 104, and the bezel 104 is provided with signal traces and other electronic components, such as a driving chip 105, a flexible circuit board 106, and the like.

The color filter substrate 102 is shorter than the array substrate 101, and the color filter substrate 102 is higher than a surface of the array substrate 101. A step substrate 101 is formed between a projection of a lower edge of the color filter substrate 102 projected onto the surface of the array substrate 101 and an edge of the array substrate 101. The step region is located in the bezel 104, other electronic components, such as the driving chip 105 and the flexible circuit board 106, are located in the step region, and the signal traces extend from the step region to the entire bezel 104 and the display region 103.

When a mother board of the display panel is being cut, a protrusion 107 is reserved at an end of the array substrate 101 away from the display region 103, the protrusion 107 is located at a middle position of the end of the array substrate 101, and indents are respectively formed adjacent both lateral sides of the protrusion 107. The driving chip 105 is disposed between a lower edge of the protrusion 107 and an edge of the display region 103, thereby raising the height between an upper side of the driving chip 105 and the edge of the display region 103 and the a height between a lower side of the driving chip 105 and the lower edge of the protrusion 107.

The flexible circuit board 106 includes a connection section connected to the bezel 104, a main body section bent to a back of the display panel, and a bending section connecting the connection section with the main body section. The bending section is located in the indents, and a bending radius of the bending section is less than or equal to the height of the protrusion 107.

In the embodiment of the present disclosure, the protrusion is disposed in accordance with the number of driving chips. The positions of the protrusion and the driving chip are not limited to the middle position of the bezel. For example, the protrusion may also be disposed close to any side of the bezel.

Therefore, compared with the display panel in the prior art, the embodiment of the present disclosure widens the spaces adjacent the upper and lower sides of the driving chip 105, without increasing the overall height of the bezel 104, which not only solves the problem of the space around the driving chip 105, but also maintains the narrow bezel of the display panel in the prior art.

Figure 2:
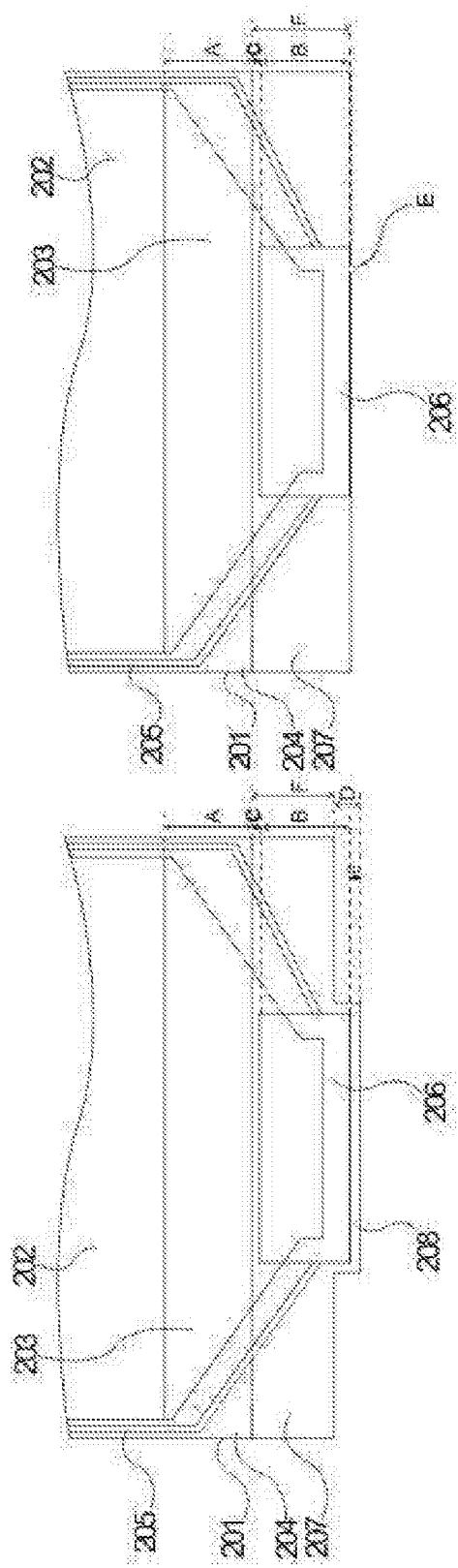
FIG. 2 is a schematic diagram of a comparison structure between a display panel provided in the present disclosure and the prior art.

As shown in FIG. 2, the left picture is a display panel provided by the present disclosure, and the right picture is a display panel of the prior art. The left picture and the right picture each include an array substrate 201, a display region 202, a driving chip 206, and a color filter substrate 204. The array substrate 201 includes a bezel 207 including a height A between a lower edge of the display region 202 and an edge of the color filter substrate 204, a height B of the driving chip 206, a height C between an upper edge of the driving chip 206 and the edge of the color filter substrate 204. The left figure also includes a height D of the protrusion 208, and a height E between a lower edge of the driving chip 206 and an edge of the protrusion 208. The left FIG. 1 includes a height F between the lower edge of the color film substrate 204 and an edge of the indent of the bezel 207, and the right figure includes a height F between the lower edge of the color filter substrate 204 and an edge of the bezel 207.

In the embodiment of the present disclosure, the overall height of the bezel=the height A+the height F+the height D, wherein the height A is substantially equal to the height F, the difference between the height A and the height F is less than 50 um, and the height D is greater than the difference between the height B and the height F. For example, the height D is 5 to 6 times the difference between the height B and the height F, thereby ensuring that the height C and the height E are not less than 100 um.

For example, refer to the specific arrangement as the following table:

| | Height/unit (um) | | | | | |
| --- | --- | --- | --- | --- | --- | --- |
| FIG. | A | B | C | D | E | F |
| Life Figure | 700 | 780 | 200 | 400 | 120 | 700 |
| Right Figure | 540 | 780 | 80 | 0 | 0 | 860 |

As can be seen from the above table, in the display panel of the embodiment of the present disclosure, the height of the protrusion 208 is added, and the driving chip 206 is moved downwards, so that the height A between the lower edge of the display region 202 and the edge of the color filter substrate 204 and the height C between the upper edge of the driving chip 206 and the edge of the color filter substrate 204 are both increased, and the height F between the lower edge of the color filter substrate 204 and the edge of the indent of the bezel 207 is reduced, compared to that in the prior art. Under the case that curvature radiuses of the flexible circuit boards are the same, the combined height of the bezel 207 and the bending section of the flexible circuit board after the flexible circuit board is bent in the embodiment of the present disclosure is smaller than that in the prior art, further shortening the height of the bezel 207.

In one embodiment, in order to reserve enough space for gate on array (GOA) traces 205, fan-out wiring 203, and metal terminals, the distance between the edge of the driving chip 206 close to the display region 202 and the edge of the display region 202 is determined to be greater than the distance between the edge of the driving chip 206 close to the protrusion 208 and the edge of the protrusion 208.

For example, the driving chip 206 is disposed in the bezel 207 and is located outside a region of the protrusion 208.

For another example, the driving chip 206 is completely or partially disposed in the region of the protrusion 208.

Figure 3A:
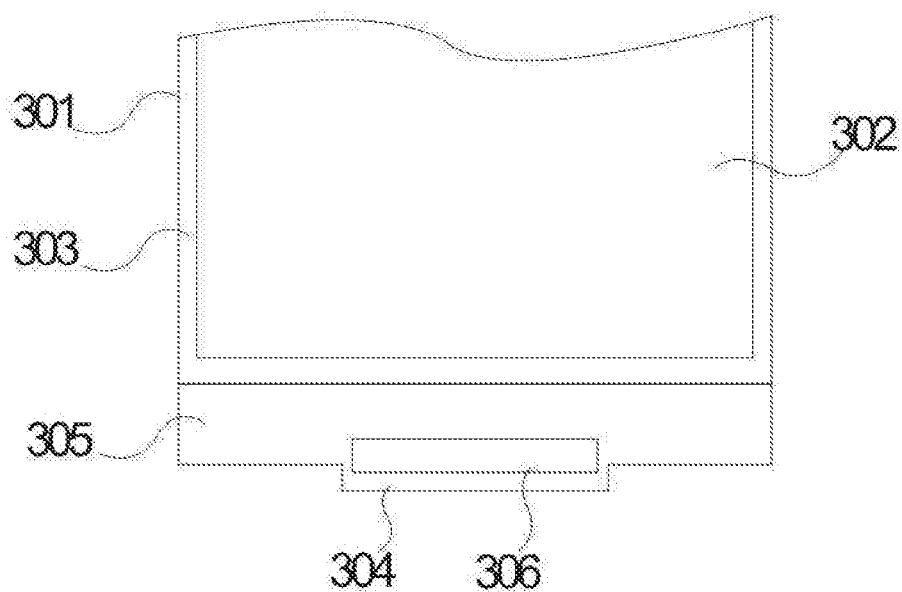
FIG. 3A is a schematic diagram of a protrusion shape structure of a display panel provided by the present disclosure.

As shown in FIG. 3A, the display panel provided in the present disclosure includes an array substrate 301, a display region 302, a color filter substrate 303, and a protrusion 304 formed at an end of the array substrate 301. A driving chip 306 is disposed in a bezel 305 of the array substrate 301.

The protrusion 304 includes two symmetrically arranged short edges connecting edges of the bezel 305, and a long edge connecting other ends of the two short edges. For example, the short edges are straight edges, the short edges are perpendicular to the edges of bezel 305, and a surface shape of the protrusion 304 is rectangular.

Figure 3B:
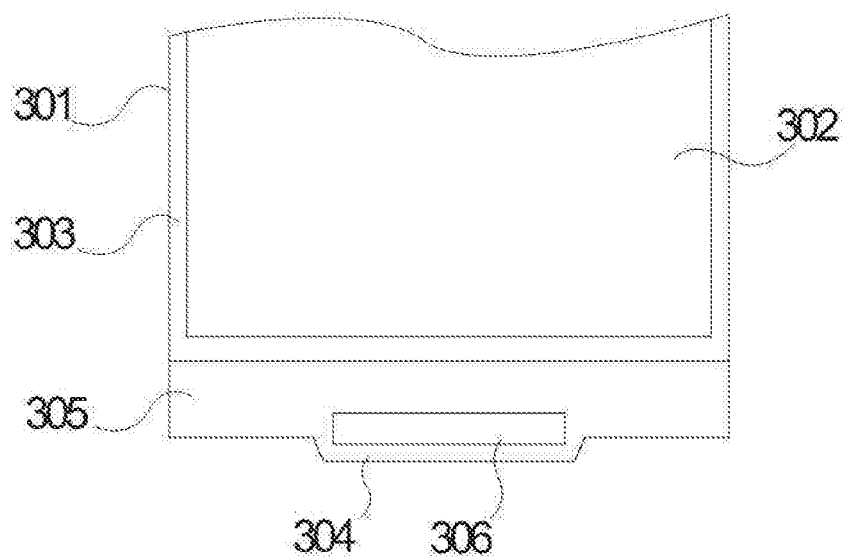
FIG. 3B is a schematic diagram of a protrusion shape structure of another display panel provided by the present disclosure.

The difference between the display panel provided in this disclosure as shown in FIG. 3B and that as shown in FIG. 3A is that the short edges are straight edges, the angles formed between the short edges and the edges of the bezel 305 are non-right angles, that is, the angle is greater than or less than 90 degrees, and the surface shape of the protrusion 304 is trapezoidal.

Figure 3C:
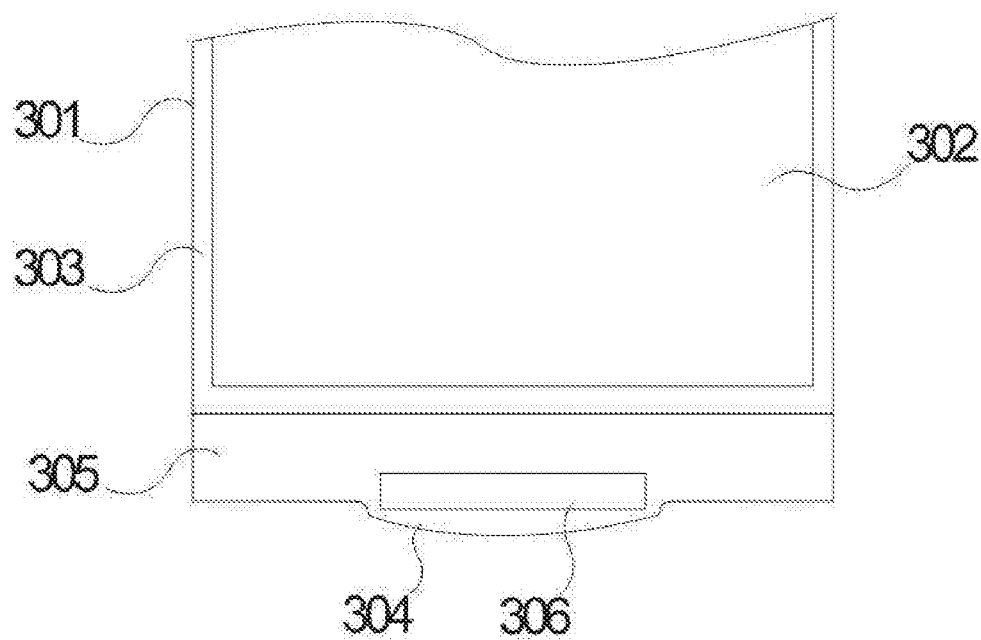
FIG. 3C is a schematic diagram of a protrusion shape structure of another display panel provided by the present disclosure.

The difference between the display panel provided in this disclosure as shown in FIG. 3C and those as shown in FIG. 3A and FIG. 3B is that the protrusion 304 includes a convex arc edge, two ends of the convex arc edge connect the edges of the bezel 305, and the ends of the convex arc edge are in concave arc transitions.

Figure 4A:
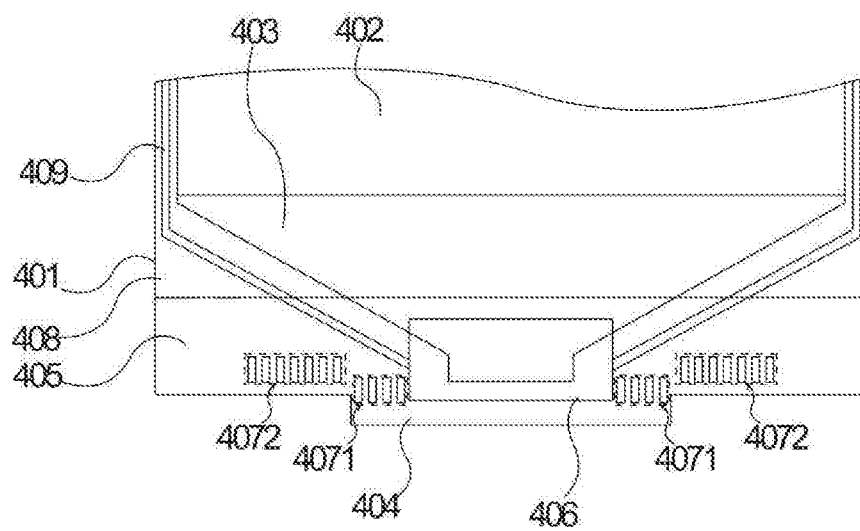
FIG. 4A is a schematic diagram of a distribution structure of metal terminals of a display panel provided by the present disclosure.

As shown in FIG. 4A, the display panel provided in this disclosure includes an array substrate 401, a color filter substrate 408, a bezel 405 located in a non-display region of the array substrate 401, a driving chip 406 disposed in the bezel 405 and fan-out traces 403 connecting the driving chip 406. For example, the fan-out traces 403 are used to transmit display data signals to the display region 402. At least one set of gate on array (GOA) traces 409 are disposed in the bezel 405, Take two sets of symmetric GOA traces 409 as an example. Two sets of the GOA traces 409 include a parallel segment located outside the display region 402 and being parallel to edges of the display region 402, and an inclined segment located in the bezel 405 and towards the driving chip 406. The inclined segment of the GOA traces 409 is connected to the driving chip 406 to input gate signals, and the parallel segment of the GOA traces 409 is connected to a scan line of each pixel row to output the gate signals.

A plurality of metal terminals are disposed in the bezel 405 and configured for accessing signals of the flexible circuit board, and the metal terminals include at least a primary signal metal terminal group 4071 and a secondary signal metal terminal group 4072. For example, the primary signal metal terminal group 4071 includes pixel data signals and gate signals, the secondary signal metal terminal group 4072 includes power signal, etc. The primary signal metal terminal group 4071 is arranged close to the driving chip 406, and the secondary signal metal terminal group 4072 is arranged away from the driving chip 406 and the inclined section of the GOA traces 409.

Because the driving chip 406 is relatively moved down, and the inclined segment of the GOA traces 409 connected to the driving chip 406 is moved down, too, thereby compressing the space where the metal terminals are arranged. If the metal terminals are too close to the GOA traces 409, the impedance increases, a signal distortion is caused, and the display quality is affected. Therefore, in the embodiment of the present disclosure, at least a part of the metal terminals are disposed away from the GOA traces 409.

In an embodiment, the secondary signal metal terminal group 4072 and the primary signal metal terminal group 4071 are separately disposed, and the main signal metal terminals are completely or partially located in the protrusion 404, and the secondary signal metal terminals are located outside the region of the protrusion 404. The distance between the metal terminals and the GOA traces 409 is effectively controlled, and the impedance is reduced.

Figure 4B:
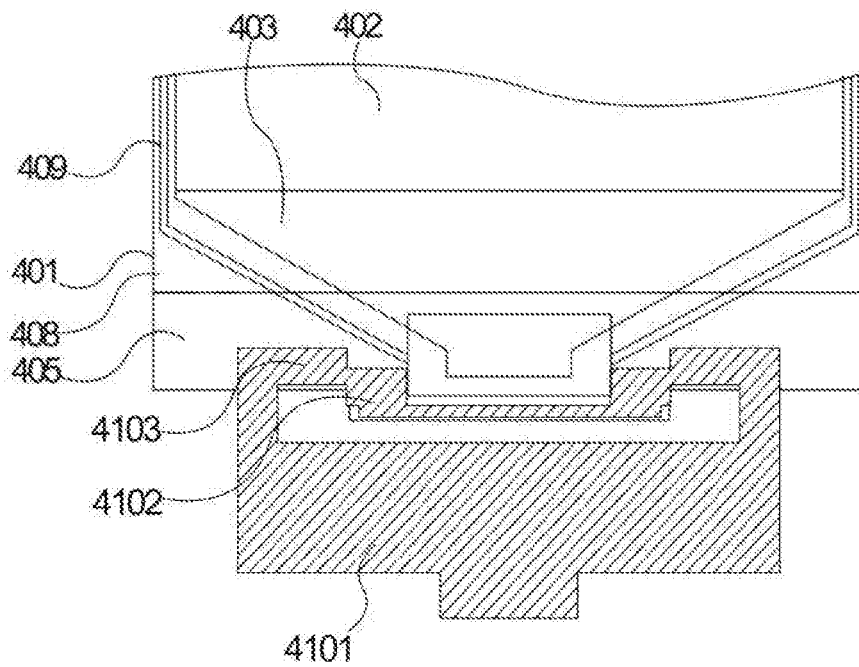
FIG. 4B is a schematic structural diagram of a flexible circuit board of the display panel provided in FIG. 4A.

As shown in FIG. 4B, the flexible circuit board includes a main body section 4101 and a connection section for connecting the metal terminals. The connection section includes a first block 4102 correspondingly connected with the main signal metal terminal group 4071, and a second block 4013 correspondingly connected with the secondary signal metal terminal group 4072, and the first block 4012 is offset from the second block 4013.

Figure 4C:
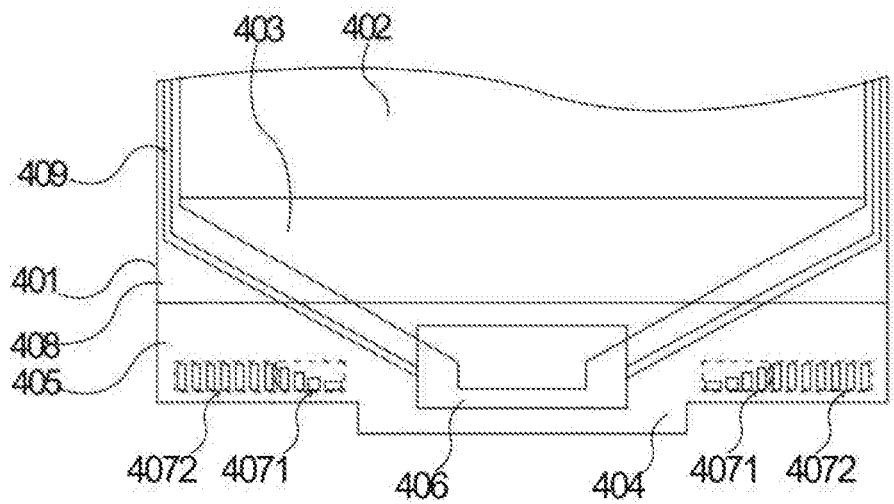
FIG. 4C is a schematic diagram of a distribution structure of metal terminals of another display panel provided by the present disclosure.

As shown in FIG. 4C, compared with the arrangement of the metal terminals in FIG. 4A, the metal terminals are closely arranged. The primary signal metal terminal group 4071 and the secondary signal metal terminal group 4072 are both disposed outside the region of the protrusion 404, thereby avoiding the reduction of the space of the protrusion 404. The area of each of the metal terminals in the primary signal metal terminal group 4071 is equivalent to the area of each of the metal terminals in the secondary signal metal terminal group 4072, to ensure a stable connection of signal contact points.

In an embodiment, a height of each of the metal terminals of the primary signal metal terminal group 4071 is lower than a height of each of the metal terminals of the secondary signal metal terminal group 4072, and a width of each of the metal terminals of the primary signal metal terminal group 4071 is wider than a width of each metal terminal of the secondary signal metal terminal group 4072. The distance between the metal terminals and the GOA traces 409 is maintained by reducing the height of the metal terminals close to the GOA traces 409, thereby reducing the impedance.

In an embodiment, a height of each of the metal terminals in the main signal metal terminal group 4071 gradually lowers from the metal terminals away from the driving chip 406 and the inclined segment of the GOA traces 409 to the metal terminals close to the driving chip 406 and the inclined segment of the GOA traces 409, and a width of each of the metal terminals in the main signal metal terminal group 4071 gradually increases from the metal terminals away from the driving chip 406 and the inclined segment of the GOA traces 409 to the metal terminals close to the driving chip 406 and the inclined segment of the GOA traces 409, for ensuring the same distance between each of the metal terminals and the GOA traces.

Figure 4D:
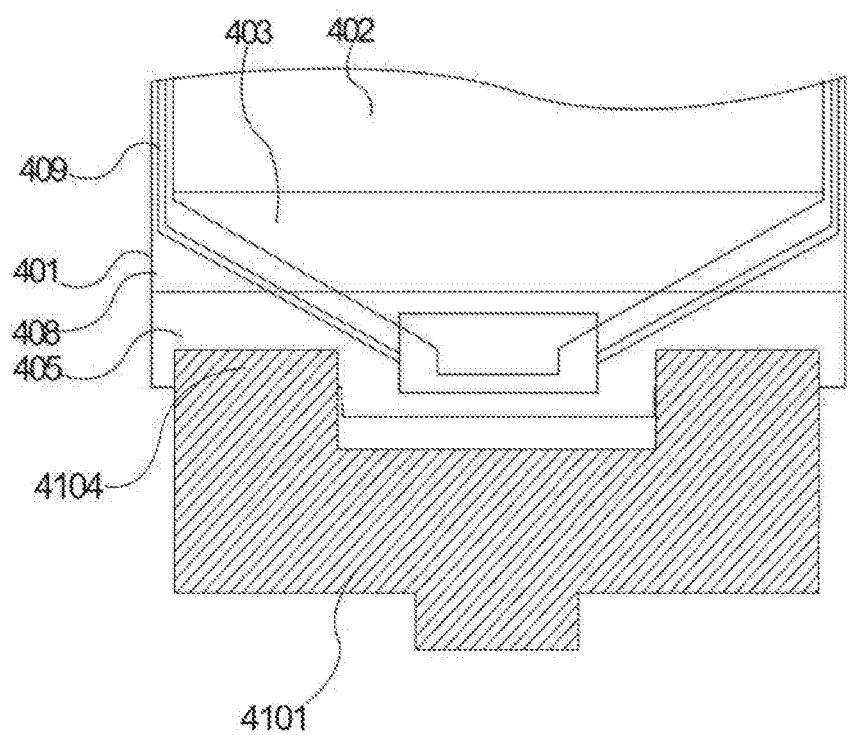
FIG. 4D is a schematic structural diagram of a flexible circuit board of the display panel provided in FIG. 4C.

As shown in FIG. 4D, the flexible circuit board includes a main body section 4101 and a connection section 4104 for connecting the metal terminals, an end of the connection section 4104 has a regular geometric shape, the end of the connection section 4104 is provided with a first connection region and a second connection region, the first connection region covers and connects the main signal metal terminal group, and the second connection region covers and connects the secondary signal.

In an embodiment, a virtual metal terminal group is further disposed in the bezel 405, and the virtual metal terminal group is located adjacent a lateral side of the secondary signal metal terminal group 4072 away from the driving chip 406 and the inclined segment of the GOA traces 409.

The beneficial effects of the present disclosure is as follows: compared with the existing display panel, the display panel provided by the present disclosure is provided with the protrusion at the end of the array substrate, and the driving chip is provided in the space between the display region and the protrusion, thereby increasing the distance between the driving chip and the edge of the display region and the distance between the driving chip and the edge of the bezel, and preventing the technical defects that the area of the bezel in a display screen with a high screen-body ratio is compressed, causing the driving chip to be too close to the display region and an edge of the substrate, and thereby causing poor electrical properties, and poor sealing of the liquid crystal cell after the driving chip is mounted. Moreover, a bending section of the flexible circuit board is located in flat regions adjacent both lateral sides of the protrusion, and the thickness of the bending section does not exceed the edge of the protrusion, so a width of the bezel is not increased, and the screen-body ratio of the display device is maintained.

In summary, although the preferable embodiments of the present disclosure have been disclosed above, the embodiments are not intended to limit the present disclosure. A person of ordinary skill in the art, without departing from the spirit and scope of the present disclosure, can make various modifications and variations. Therefore, the scope of the disclosure is defined in the claims.

What is claimed is:

1. A display panel comprising:
an array substrate and a display region disposed on a surface of the array substrate, wherein a portion of the array substrate not covered by the display region forms a bezel, and a driving chip and a flexible circuit board are bound in the bezel;
wherein at least one a protrusion is formed at an end of the bezel away from the display region, and the driving chip is located between an edge of the protrusion and an edge of the display region;
wherein a portion of the flexible circuit board is bent to a back of the array substrate via an edge of an indent adjacent at least one lateral side of the protrusion;
wherein at least one set of gate on array (GOA) traces are disposed on the array substrate, the GOA traces include a parallel segment located outside the display region and being parallel to edges of the display region, and an inclined segment located in the bezel and towards the driving chip, the inclined segment of the GOA traces is connected to the driving chip to input a gate signal, and the parallel segment of the GOA traces is connected to a scan line of each pixel row to output the gate signal;
wherein a plurality of metal terminals are disposed in the bezel and configured for accessing signals of the flexible circuit board, and the metal terminals include at least a primary signal metal terminal group and a secondary signal metal terminal group, wherein the primary signal metal terminal group is arranged close to the driving chip, and the secondary signal metal terminal group is arranged away from the driving chip and the inclined section of the GOA traces;
wherein the secondary signal metal terminal group and the primary signal metal terminal group are separately disposed, the primary signal metal terminal group is completely or partially located within a region of the protrusion, and the secondary signal metal terminal group is located outside the region of the protrusion;
wherein the flexible circuit board includes a main body section and a connection section for connecting the metal terminals, the connection section includes a first block correspondingly connected with the main signal metal terminal group, and a second block correspondingly connected with the secondary signal metal terminal group, and the first block is offset from the second block.

2. The display panel as claimed in claim 1, wherein a distance between an edge of the driving chip close to the display region and the edge of the display region is greater than a distance between an edge of the driving chip close to the protrusion and the edge of the protrusion.

3. The display panel as claimed claim 2, wherein the driving chip is disposed in the bezel and is located outside a region of the protrusion.

4. The display panel as claimed in claim 2, wherein the driving chip is completely or partially disposed in a region of the protrusion.

5. The display panel as claimed in claim 1, wherein the protrusion includes two symmetrically arranged short edges connecting edges of the bezel, and a long edge connecting ends of the two short edges;
the short edges are perpendicular to the edges of the bezel; and
an angle formed between the short edges and the edges of the bezel is a non-right angle.

6. The display panel as claimed in claim 1, wherein the protrusion includes a convex arc edge, two ends of the convex arc edges are connected to the edges of the bezel, and the ends of the convex arc edges are in concave arc transitions.

7. A display panel comprising:
an array substrate and a display region disposed on a surface of the array substrate, wherein a portion of the array substrate not covered by the display region forms a bezel, and a driving chip and a flexible circuit board are bound in the bezel;
wherein at least one a protrusion is formed at an end of the bezel away from the display region, and the driving chip is located between an edge of the protrusion and an edge of the display region;
wherein a portion of the flexible circuit board is bent to a back of the array substrate via an edge of an indent adjacent at least one lateral side of the protrusion;
wherein at least one set of gate on array (GOA) traces are disposed on the array substrate, the GOA traces include a parallel segment located outside the display region and being parallel to edges of the display region, and an inclined segment located in the bezel and towards the driving chip, the inclined segment of the GOA traces is connected to the driving chip to input a gate signal, and the parallel segment of the GOA traces is connected to a scan line of each pixel row to output the gate signal;
wherein a plurality of metal terminals are disposed in the bezel and configured for accessing signals of the flexible circuit board, and the metal terminals include at least a primary signal metal terminal group and a secondary signal metal terminal group, wherein the primary signal metal terminal group is arranged close to the driving chip, and the secondary signal metal terminal group is arranged away from the driving chip and the inclined section of the GOA traces;
wherein a virtual metal terminal group is further disposed in the bezel, and the virtual metal terminal group is located adjacent a lateral side of the secondary signal metal terminal group away from the driving chip and the inclined segment of the GOA traces.

8. A display panel comprising:
an array substrate and a display region disposed on a surface of the array substrate, wherein a portion of the array substrate not covered by the display region forms a bezel, and a driving chip and a flexible circuit board are bound in the bezel;
wherein at least one a protrusion is formed at an end of the bezel away from the display region, and the driving chip is located between an edge of the protrusion and an edge of the display region;
wherein a portion of the flexible circuit board is bent to a back of the array substrate via an edge of an indent adjacent at least one lateral side of the protrusion;
wherein at least one set of gate on array (GOA) traces are disposed on the array substrate, the GOA traces include a parallel segment located outside the display region and being parallel to edges of the display region, and an inclined segment located in the bezel and towards the driving chip, the inclined segment of the GOA traces is connected to the driving chip to input a gate signal, and the parallel segment of the GOA traces is connected to a scan line of each pixel row to output the gate signal;
wherein a plurality of metal terminals are disposed in the bezel and configured for accessing signals of the flexible circuit board, and the metal terminals include at least a primary signal metal terminal group and a secondary signal metal terminal group, wherein the primary signal metal terminal group is arranged close to the driving chip, and the secondary signal metal terminal group is arranged away from the driving chip and the inclined section of the GOA traces;

wherein an area of each of the metal terminals in the primary signal metal terminal group is equivalent to an area of each of the metal terminals in the secondary signal metal terminal group;

a height of each of the metal terminals of the main signal metal terminal group is lower than a height of each of the metal terminals of the secondary signal metal terminal group, and a width of each of the metal terminals of the main signal metal terminal group is wider than a width of each of the metal terminals of the secondary signal metal terminal group.

9. The display panel as claimed claim 8, wherein a height of each of the metal terminals in the main signal metal terminal group gradually lowers from the metal terminals away from the driving chip and the inclined segment of the GOA traces to the metal terminals close to the driving chip and the inclined segment of the GOA traces; and a width of each of the metal terminals in the main signal metal terminal group gradually increases from the metal terminals away from the driving chip and the inclined segment of the GOA traces to the metal terminals close to the driving chip and the inclined segment of the GOA traces.

10. The display panel as claimed in claim 9, wherein the flexible circuit board includes a main body section and a connection section for connecting the metal terminals, an end of the connection section has a regular geometric shape, the end of the connection section is provided with a first connection region and a second connection region, the first connection region covers and connects the main signal metal terminal group, and the second connection region covers and connects the secondary signal.

* * * * *